May 31, 1932.　　　　　L. VENDITTI　　　　　1,860,698
AQUARIUM
Filed June 14, 1930　　　2 Sheets-Sheet 2
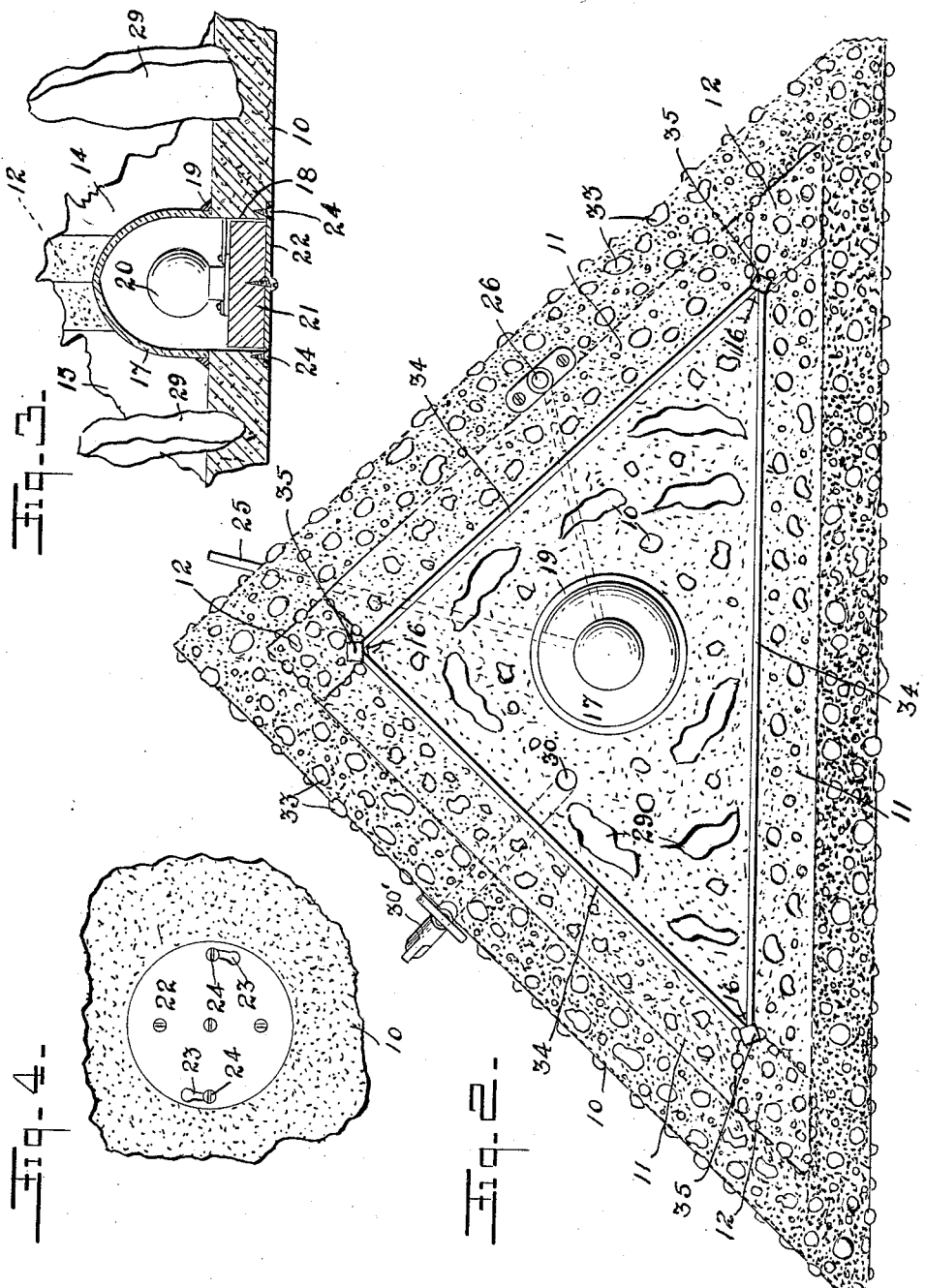
INVENTOR
Larry Venditti
BY
Joshua R. H. Potts
HIS ATTORNEY Patented May 31, 1932

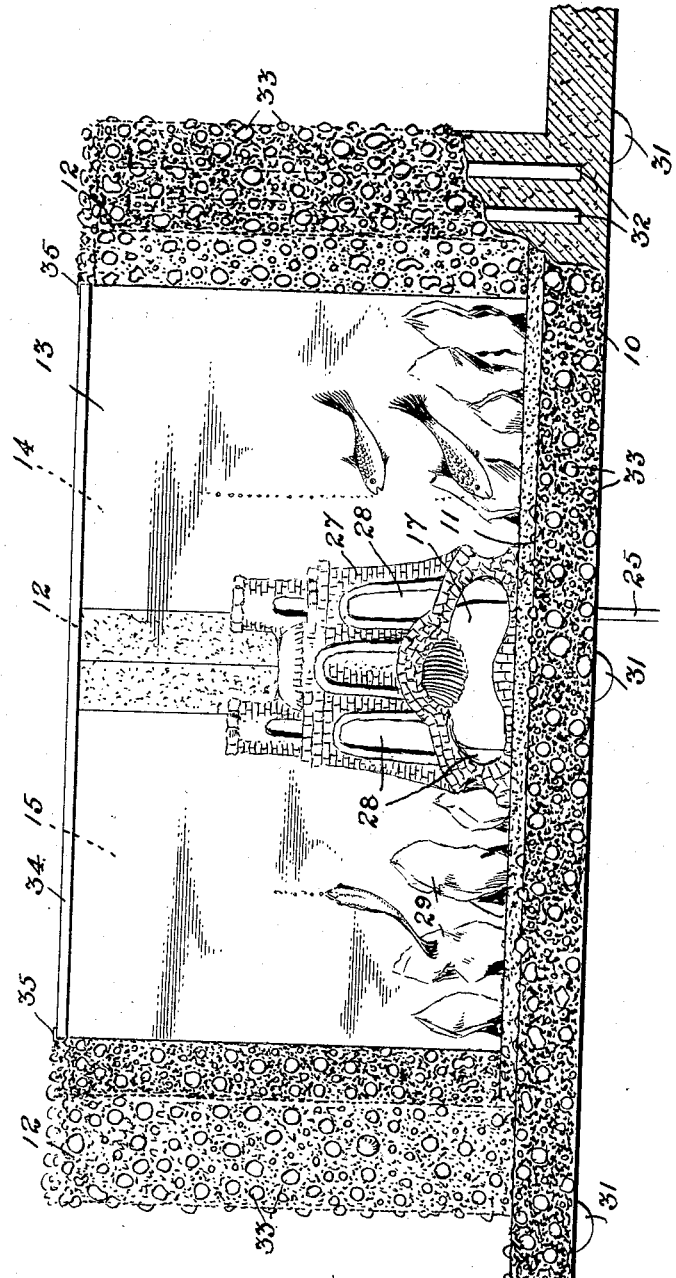

1,860,698

UNITED STATES PATENT OFFICE

LARRY VENDITTI, OF PHILADELPHIA, PENNSYLVANIA

AQUARIUM

Application filed June 14, 1930. Serial No. 461,065.

This invention relates to aquariums, and has for an object to provide an aquarium more nearly resembling a natural site, or setting, than is provided in the usual device of the kind.

It is well known that the attractiveness of an aquarium is enhanced by the approach to the natural, that is to say, the more nearly the device may be made to resemble nature, the more attractive it appears. In the usual construction of such devices, ornamental effects, if any, have been directed rather to such features as are wholly differing from the appearance of natural settings, and it is the object of the present invention to provide such a device as will appear to the beholder as nearly in accordance with nature as possible.

It is a further object of the invention to provide an illuminating element within the body of the aquarium, whereby the interior may not only be illuminated, but to provide in conjunction therewith, reflecting bodies as for instance, rocks having reflecting or refracting facettes, so positioned as to reflect or refract the light from the illuminating element.

It is a further object of the invention to so mount and arrange the said reflecting and refracting elements that they shall be permanently fixed to the base of the aquarium, and while performing their function as reflecting and refracting element, also provide spaces and interstices for the sporting of the aquatic animals within the aquarium.

It is a further object of the invention to provide an aquarium having the usual transparent sides but such transparent sides mounted and maintained in a monolithic structure for rigidity, also for the prevention of leakage or the like.

It is a further object of the invention to provide a monolithic structure constructed of plastic material, in the surface of which have been embedded foreign bodies, of an ornamental nature, as for instance, pebbles, coarse gravel, or the like.

According to the present invention, the aquarium may assume any form and will be constructed with a base and upstanding posts of monolithic formation, said base and posts being ornamented by bodies inserted or embedded therein, and with other bodies of reflecting or refracting nature embedded in the base within the lines of the aquarium with an illuminating element positioned to illuminate such reflecting and refracting bodies.

My invention is directed to other objects and possesses other features of novelty and advantage, some of which, together with the foregoing, will be hereinafter more fully set forth.

In the drawings:—

Figure 1 is a view in side elevation of one embodiment of the invention,

Figure 2 is a top plan view of the embodiment of the invention shown in Figure 1, Figure 3 is a sectional view taken through the light chamber showing the reflecting and refracting bodies embedded in the base, and Figure 4 is a fragmentary inverted plan view showing the manner of mounting the illuminating element in the body.

Like characters of reference indicate corresponding parts throughout the several views.

The improved aquarium, which forms the subject matter of this application, may be of any shape that fancy may dictate. In the drawings, a triangular aquarium has been shown largely for the purpose of more clearly indicating a complete departure from accepted standards. Whatever the form, it will comprise a base 10, having an upstanding shoulder 11, which said shoulder will define the margins of the body and will take the shape determined upon, and being here shown as triangular is not to be considered a limitation.

Erected upon the base 10, will be a plurality of posts 12, the number of such posts being determined by the polyangularity of the device. In the drawings, such posts are shown as three in number and in such triangular construction, a plate 13 of glass, will form one of the sides indicated in the drawings as the front, while the other plates of glass 14 and 15, will form two other sides. If the number of sides is greater than three, it is obvious that the number of plates of glass, and posts, will be increased. These plates of glass, or other suitable transparent media, are secured in position by having their lower edges engaging the shoulders 11, and their vertical edges the several posts 12, and being secured and maintained against leakage in the usual manner by the use of cementitious material indicated at 16.

Within the body of the aquarium, defined by the several plates of glass, will be erected an illuminating element comprising a transparent dome 17, which will be erected over an opening 18 in the bottom of the base 10, and will be rendered leak proof by the usual cementitious material 19, as shown. Within this dome 17, a light element 20 will be inserted in any approved manner as by being attached to a block 21, having a plate 22, connected therewith with key hole slots 23 engaging fastening members as screws 24 embedded in the material of the base 10. By a rotation, of the amplitude of the key hole slot 23, said plate 22 may be inserted or removed and locked therein. Wiring 25 is indicated in the drawings, with a switch 26, for controlling the current to the lighting element 20.

Preferably, the dome 17 will be covered by an ornamental device, indicated conventionally at 27, with openings 28, through which the light from the illuminating element will pass, and into engagement with reflecting and refracting bodies 29 which are embedded permanently and rigidly in the base 10. No limitation is implied by this description of reflecting and refracting members. The present indication is that rocks such as flint, quartz or the like, having reflecting or refracting facettes are or may be employed, but that will be no limitation upon the use of other reflecting or refracting bodies.

For the purpose of evacuating the aquarium, a conduit 30, terminating in a spigot 30', is provided so that the water may be drawn from the aquarium as may seem desirable. Also, the device being constructed of concrete, or like plastic material, will be of rough nature and will tend to mar tables and the like, and for the purpose of preventing this, feet 31 are provided preferably in the nature of semi-spherical rubber tips. To strengthen the structure, reinforcing may be inserted, such reinforcing being indicated at Figure 1, by the bars 32 extending from the post 12, in the homogeneous mass and into the bottom or base 10. The employment of such reinforcing is no indication of other than monolithic structure but merely that the monolithic structure is thereby strengthened and made more rigid.

The material referred to as concrete, while still in a plastic condition, will be ornamented further by applying thereto, pebbles 33 or other like ornamental members, and it will be obvious that these pebbles may be of any size, actual or relative, and may be of any color or colors that fancy may dictate.

Preferably, the upper edges of the transparent sheets will be finished, strengthened, and protected by channels 34, which simply embrace the upper edges of the sheets. To maintain these channels in position, strips of metal 35 are embedded in the posts 12, when being molded and after the channels 34 are in position, these strips 35 are bent downwardly and soldered across the junction of the adjacent channels.

So constructed, the device will have a near approach to natural appearance, and will also provide quarters in which the aquatic animals will be more content to live and therefore their lives prolonged.

Of course, the aquarium, herein illustrated, may be modified in various ways without departing from the invention herein set forth and hereinafter claimed.

The invention is hereby claimed as follows:

1. An aquarium comprising a monolithic base and upright posts, an illuminating element uprising from the base, and reflecting bodies embedded in, and upstanding from the base, and surrounding the illuminating element.

2. An aquarium comprising a monolithic base and upstanding posts, said base having an opening therethrough, a transparent dome covering the opening and upstanding above the base, an illuminating element inserted through the base and into the dome, and reflecting bodies embedded in the base and surrounding the illuminating element, in position to reflect light therefrom.

3. An aquarium comprising a monolithic base and upstanding posts, with reinforcing material for strengthening said structure, transparent sheets supported by said base and posts and forming a body, an illuminating element erected within the body, an ornamental body covering said illuminating element and provided with openings therethrough, and reflecting bodies embedded in, and upstanding above, said base and surrounding the said ornamental body, and positioned to reflect light passing through said openings.

In testimony whereof I have signed my name to this specification.

LARRY VENDITTI.